United States Patent
Min et al.

(10) Patent No.: US 11,174,011 B2
(45) Date of Patent: Nov. 16, 2021

(54) LOW DRAG HUB FOR ROTOR

(71) Applicant: LOCKHEED MARTIN CORPORATION, Bethesda, MD (US)

(72) Inventors: Byung-Young Min, Trumbull, CT (US); Patrick Ormande Bowles, Glastonbury, CT (US); Brian Ernest Wake, Monroe, CT (US); Margaret G. Battisti, Naugatuck, CT (US); Peter F. Lorber, Southbury, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 375 days.

(21) Appl. No.: 16/267,517

(22) Filed: Feb. 5, 2019

(65) Prior Publication Data

US 2020/0247534 A1 Aug. 6, 2020

(51) Int. Cl.
*B64C 27/10* (2006.01)
*B64C 27/32* (2006.01)
*F04D 29/18* (2006.01)

(52) U.S. Cl.
CPC ............. *B64C 27/10* (2013.01); *B64C 27/32* (2013.01); *F04D 29/181* (2013.01)

(58) Field of Classification Search
CPC ......... B64C 27/10; B64C 27/32; B64C 11/02; F04D 29/181
See application file for complete search history.

(56) References Cited

U.S. PATENT DOCUMENTS

| 2,450,491 | A |   | 10/1948 | Solovioff et al. |
| 4,323,332 | A | * | 4/1982 | Fradenburgh .......... B64C 27/41 |
|   |   |   |   | 416/102 |
| 7,530,787 | B2 |   | 5/2009 | Bertolotti et al. |
| 9,132,914 | B2 |   | 9/2015 | Matalanis et al. |
| 9,688,395 | B2 |   | 6/2017 | Moffitt et al. |
| 2017/0096212 | A1 |   | 4/2017 | Florea et al. |
| 2017/0225771 | A1 | * | 8/2017 | Bowles .................. B64C 27/32 |
| 2017/0283046 | A1 |   | 10/2017 | Egolf et al. |
| 2017/0327215 | A1 |   | 11/2017 | Orbon et al. |

FOREIGN PATENT DOCUMENTS

| EP | 1990275 A1 | * | 11/2008 | ............ B64C 27/12 |
| EP | 1990275 A1 |   | 11/2008 |   |
| EP | 3059167 A2 |   | 8/2016 |   |
| EP | 3181445 A1 |   | 6/2017 |   |
| WO | 201712391 A1 |   | 7/2017 |   |

OTHER PUBLICATIONS

Search Report for EP Application No. 20155324.5 dated Jun. 15, 2020, 14 pages.

* cited by examiner

*Primary Examiner* — David E Sosnowski
*Assistant Examiner* — Sabbir Hasan
(74) *Attorney, Agent, or Firm* — Michael Best & Friedrich LLP

(57) ABSTRACT

A rotor assembly includes a first rotor hub and a second rotor hub. The second rotor hub is coupled to the first rotor hub via a shaft fairing. The first rotor hub has a flat first surface coupled to the shaft fairing and a curved second surface opposite the flat first surface. The second rotor hub has a flat first surface on the lower side and a curved second surface opposite the flat first surface.

18 Claims, 4 Drawing Sheets

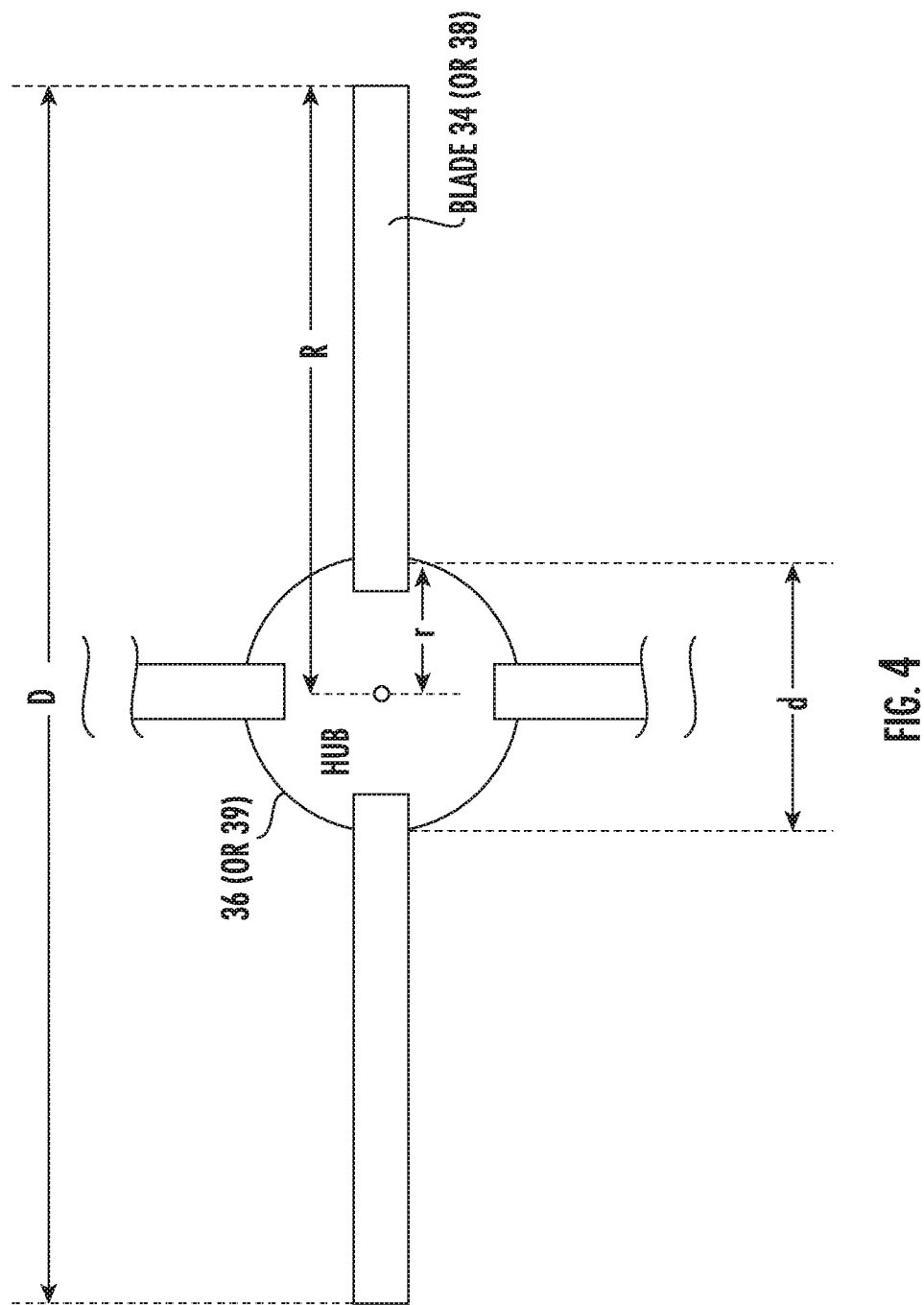

LOW DRAG HUB FOR ROTOR

BACKGROUND

Exemplary embodiments relate to the art of aircraft, and more particularly, to a low drag hub for a coaxial rotor.

Conventional rotary-wing aircraft have a forward airspeed that is limited by a number of factors. Among these factors is the existence of drag when traveling at high speeds. Various surfaces on the rotary wing aircraft, both stationary and rotating, create drag during flight. Drag has a direct effect on aircraft power requirements, range, and efficiency. Accordingly, it is desirable to increase an overall lift-to-equivalent-drag ratio (L/DE) to enhance an operational envelope of the rotary wing aircraft.

BRIEF DESCRIPTION

According to one or more embodiments, a rotor assembly is provided. The rotor assembly comprises a first rotor hub, and a second rotor hub coupled to the first rotor hub via a shaft fairing. The first rotor hub has a flat first surface coupled to the shaft fairing and a curved second surface opposite the flat first surface.

In addition to one or more of the features described above or below, or as an alternative, further embodiments could include wherein the curved second surface and the flat first surface meet to form a rounded edge.

In addition to one or more of the features described above or below, or as an alternative, further embodiments could include wherein the curved second surface of the first rotor hub is smooth and continuous from a leading edge to a trailing edge, thereby maintaining air flow.

In addition to one or more of the features described above or below, or as an alternative, further embodiments could include wherein the second rotor hub comprises a flat first surface opposite a curved second surface.

In addition to one or more of the features described above or below, or as an alternative, further embodiments could include wherein the first rotor hub and the second rotor hub comprise substantially a same shape.

In addition to one or more of the features described above or below, or as an alternative, further embodiments could include wherein the first rotor hub is structured to position a plurality of rotor blades.

In addition to one or more of the features described above or below, or as an alternative, further embodiments could include wherein the second rotor hub is structured to position another plurality of rotor blades.

In addition to one or more of the features described above or below, or as an alternative, further embodiments could include wherein the first rotor hub comprises a hub radius, the hub radius being about 0.05 to 0.25 times a value of a blade radius of one of the plurality of rotor blades.

In addition to one or more of the features described above or below, or as an alternative, further embodiments could include wherein the first rotor hub comprises a hub diameter and a hub thickness, the hub thickness being less than 35% of the hub diameter.

In addition to one or more of the features described above or below, or as an alternative, further embodiments could include wherein the shaft fairing is structured to comprise a rotor shaft, the rotor shaft being operatively connected to at least one engine.

According to one or more embodiments, a rotary wing aircraft is provided. The rotary wing aircraft comprises at least one engine, and a rotor assembly coupled to the at least one engine. The rotor assembly comprises a first rotor hub, and a second rotor hub coupled to the first rotor hub via a shaft fairing, the first rotor hub having a flat first surface coupled to the shaft fairing and a curved second surface opposite the flat first surface.

BRIEF DESCRIPTION OF THE DRAWINGS

The following descriptions should not be considered limiting in any way. With reference to the accompanying drawings, like elements are numbered alike:

FIG. 4 depicts a top view of the hub in accordance with an exemplary embodiment.

DETAILED DESCRIPTION

A detailed description of one or more embodiments of the disclosed apparatuses are presented herein by way of exemplification and not limitation with reference to the Figures.

Coaxial rotors or "coax rotors" are a pair of helicopter rotors mounted one above the other on concentric shafts, with the same axis of rotation, but turning in opposite directions (contra-rotating). The rotor hub is one of the largest contributors to the vehicle drag, accounting for 25%-30% of the aircraft total drag. High drag limits maximum flight speed and reduces vehicle efficiency. Computational Fluid Dynamics (CFD) showed that the current hub has a large flow separation region, which leads to higher drag. One or more embodiments of the invention are configured to reduce hub system drag thereby enabling faster fight speed and provide less fuel burn for a given flight speed. This drag reduction is estimated to increase the maximum speed of the aircraft by 5 knots, according to an exemplary embodiment.

Figure 3:
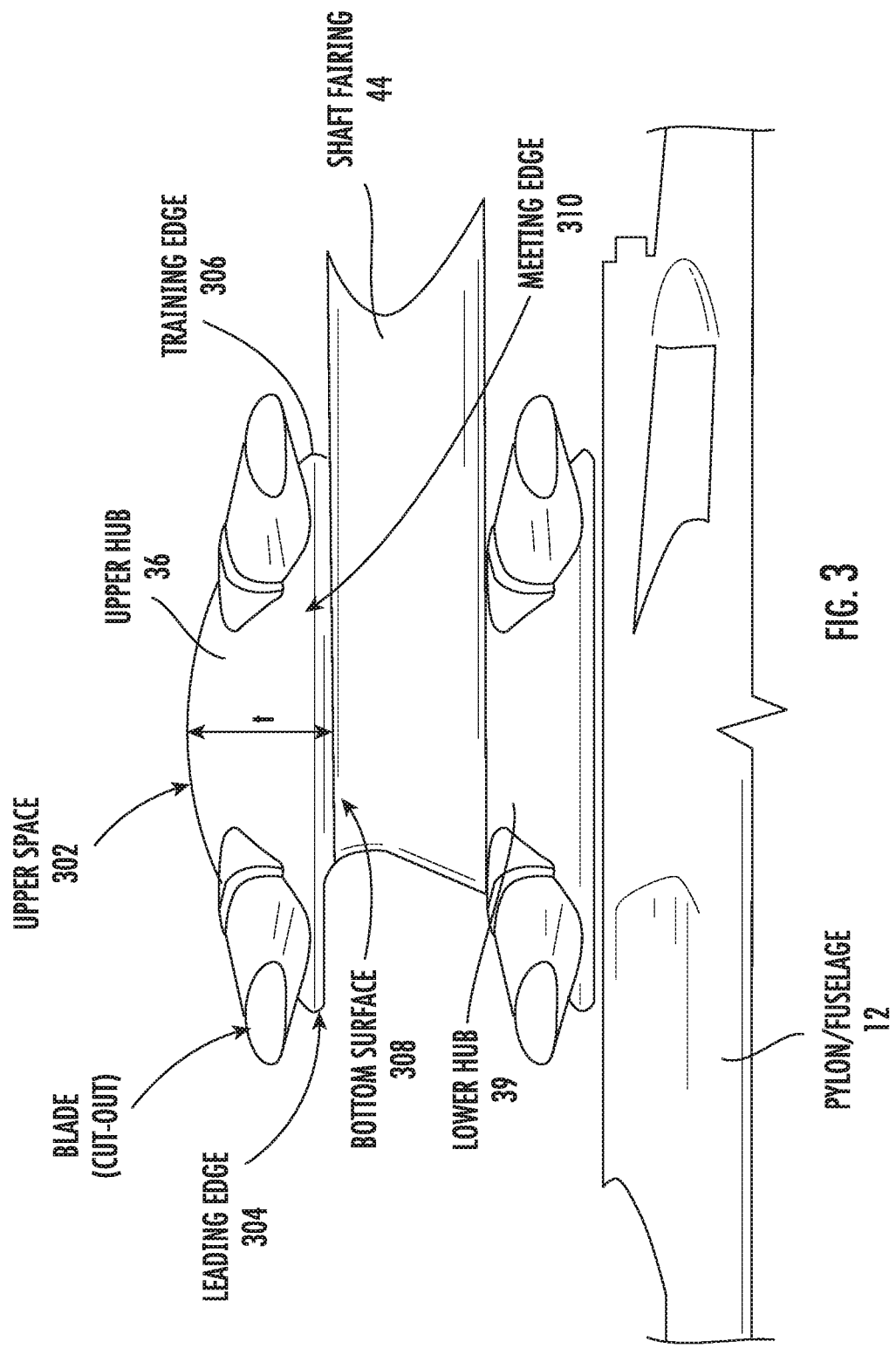
FIG. 3 depicts a side view of upper and lower hubs in accordance with an exemplary embodiment.

CFD simulations showed that the hub experienced flow separation in the aft portion of lower and upper hubs, and a large stagnation region in the frontal area. After examination of CFD flow field, it was realized that the current convex lower surface shape induces the separation and large stagnation area. However, one or more embodiments of the invention provide a redesigned hub surface so that the upper surface has a convex shape from the leading edge to its trailing edge with a flat bottom surface. The convex upper surface is smooth and continuous from leading to trailing edge to maintain attached flow. The flat bottom surface removes the backward-facing ramp effect that leads to flow separation around the trailing edge (as depicted in FIG. 3), and minimizes the flow separation. Backward-facing ramp relates to air flow associated with the trailing edge. The hub is rotating with the blade, and the hub shape is axisymmetric.

Figure 1:
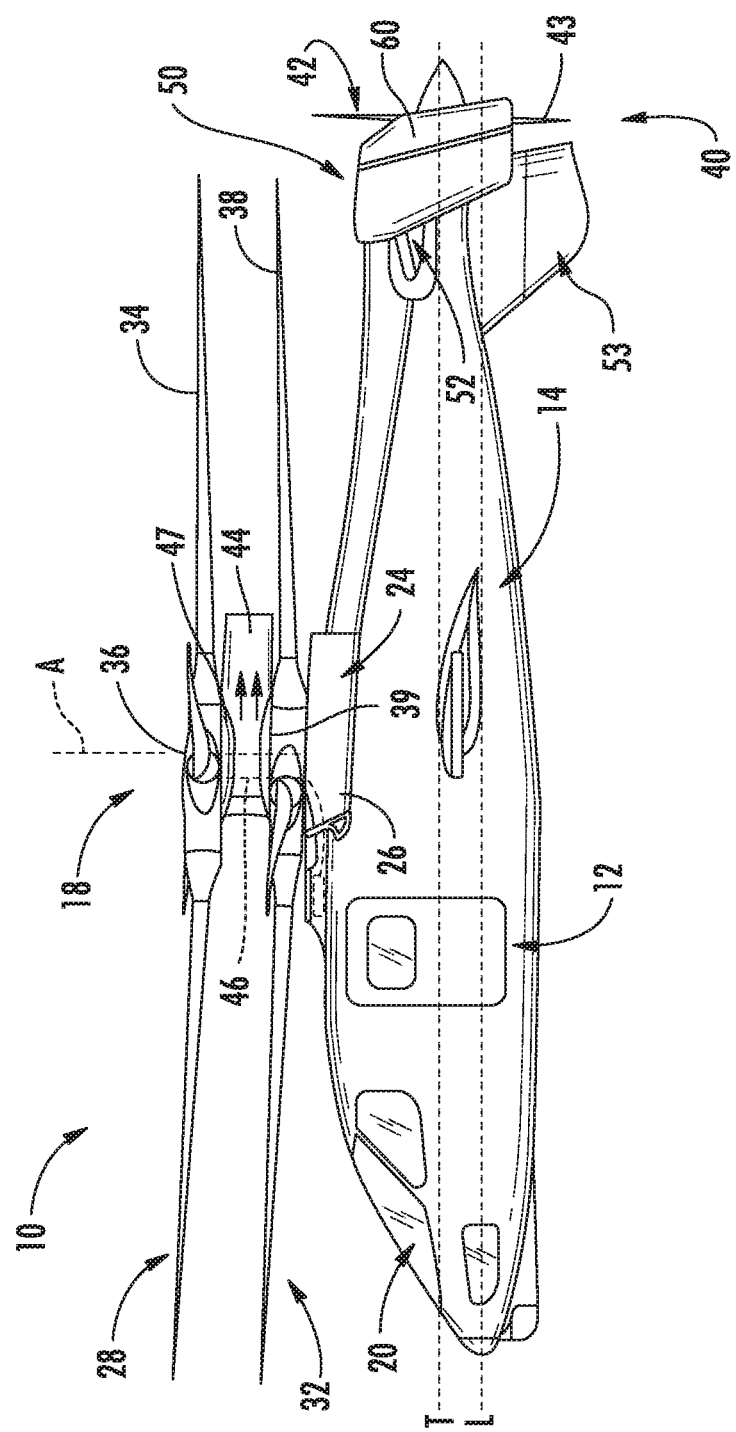
FIG. 1 depicts a rotary wing aircraft in accordance with an exemplary embodiment.
Figure 2:
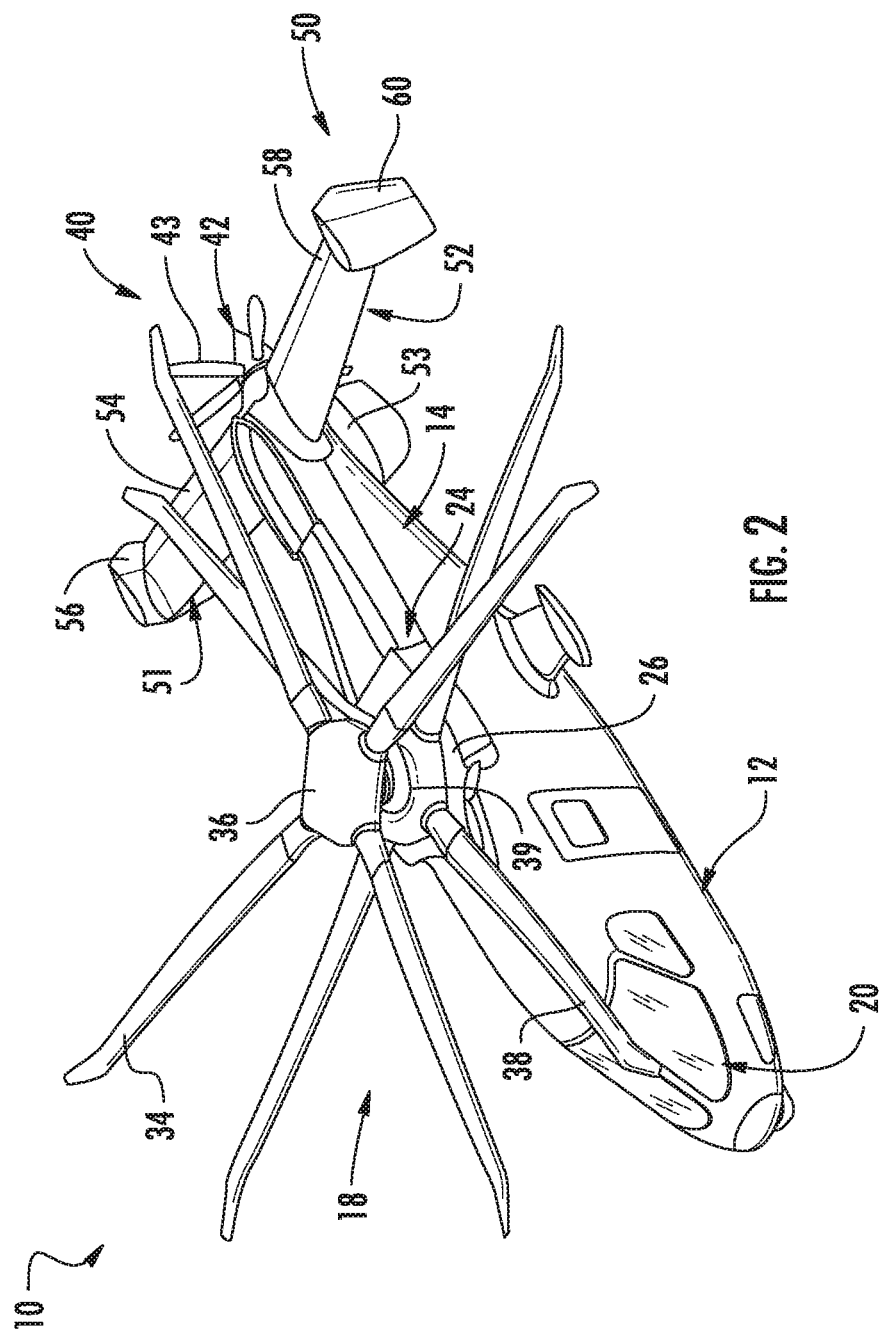
FIG. 2 depicts a perspective view of the rotary wing aircraft of FIG. 1 in accordance with an exemplary embodiment.

Turning now to a more detailed description of embodiments, FIGS. 1 and 2 depict an exemplary embodiment of a rotary wing, vertical takeoff and landing (VTOL) aircraft 10. Aircraft 10 includes an airframe or fuselage 12 having a plurality of surfaces (not separately labeled) with an extending tail 14. A coaxial main rotor assembly 18 is located at the fuselage 12 and rotates about a main rotor axis, A. In an exemplary embodiment, the fuselage 12 includes a cockpit 20 having two seats for flight crew (e.g., pilot and co-pilot) and six seats for passengers (not shown). Main rotor assembly 18 is driven by a power source, for example, one or more engines 24, via a gearbox 26. Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors).

In accordance with an exemplary embodiment, upper rotor assembly 28 includes a first plurality of rotor blades 34 supported by a first or upper rotor hub 36. Lower rotor assembly 32 includes a second plurality of rotor blades 38 supported by a second or lower rotor hub 39. In some embodiments, aircraft 10 may include a translational thrust system 40 having a propeller 42 located at extending tail 14 to provide translational thrust (forward or rearward) for aircraft 10. Propeller 42 includes a plurality of blades 43.

Main rotor assembly 18 also includes a shaft fairing 44 (also referred to as a sail fairing) generally located between and around the upper and lower rotor assemblies 28 and 32 such that lower rotor hub 39 may be at least partially contained therein. Shaft fairing 44 extends about a rotor shaft 46 operatively connecting upper rotor assembly 28 and engine(s) 24. Shaft fairing 44 extends between lower hub 39 and an upper hub member 47 arranged inwardly of upper rotor assembly 28 and operates to reduce drag which might otherwise exist at rotor shaft 46. First plurality of rotor blades 34 may be connected to upper rotor hub 36 in a hingeless manner, also referred to as a rigid rotor system. Similarly, second plurality of rotor blades 38 may be connected to lower rotor hub 39 in a hingeless manner. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors.

Propeller 42 or translational thrust system 40 is connected to and driven by the engine 24 via the gearbox 26. Translational thrust system 40 may be mounted to the rear of the fuselage 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to or instead of translational thrust. It should be further understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

FIG. 3 depicts a side view of the upper and lower hubs according to an exemplary embodiment. Particularly, further details of the upper and lower hubs are illustrated in FIG. 3. Some features of the aircraft have been removed in FIG. 3 for sake of clarity and understanding. For example, the blades are omitted so as not to obscure the figure. As can be seen in FIG. 3, the hub surface of the upper hub 36 and lower hub 39 are designed so that the curved upper surface 302 has a convex shape from the leading edge 304 to the trailing edge 306 while having a flat bottom surface 308. A flat surface may be defined as a plane horizontal surface with no depth. Additionally or alternatively, a flat surface may be defined as a plane horizontal surface having no curvature or rounded area. The curved upper surface may be defined as a rounded surface such that the curvature does not lie in/on a horizontal plane surface.

The labeling identified in the upper hub 36 applies by analogy to the lower hub 39, although detailed labeling is not illustrated on the lower hub 39. The convex upper surface 302 is smooth and continuous from leading edge 304 to trailing edge 306 thereby maintaining attached flow. The flat bottom surface 308 removes backward-facing ramp around the trailing edge 306 and minimizes flow separation. In state-of-the-art systems, the presence of the extended shaft fairing around the original backward-facing ramp hub trailing edge blocks air flow from the bottom surface. This lack of flow momentum at the backward-facing ramp causes separation. However, the new design helps flow from upper surface 302 continue to trailing edge 306 according to an exemplary embodiment. Therefore, since backward-facing ramp does not exist, momentum from bottom surface flow is not needed. The edge 310 where upper surface 302 meets bottom surface 308 is rounded with a minimal radius to avoid adverse effect at high angles of attack. For example, the rounded minimal radius might be a small lip. This is also better for manufacturing the upper and lower hubs. Further, CFD results showed significant drag reduction with the new design at moderate to high speed condition, according to exemplary embodiments. Particularly, the flow around the hubs showed well-attached flow.

Referring to FIG. 3, the upper hub 36 has a thickness "t" at the middle, as defined from the upper surface 302 to the bottom surface 308. Both upper and lower hubs have same shape. However, the upper surface of the lower hub 39 may be cut to fit to the bottom of the sail fairing 44 in one or more embodiments. Alternatively, the sail fairing 44 may be cut to encompass the upper surface of the lower hub 39 in one or more embodiments. The upper hub 302 is above the sail fairing 44 while the lower hub 39 is positioned below the sail fairing 44. The sail fairing 44 may also be referred to as the shaft fairing.

FIG. 4 depicts a top view of the hub according to an exemplary embodiment. Some features of the aircraft have been removed in FIG. 4 for sake of clarity and understanding. Although the upper hub 36 may be shown, the top view is representative of the lower hub 39 as well. Accordingly, discussions of the upper hub 36 apply by analogy to the lower hub 39. In FIG. 4, the upper hub 36 (and/or lower hub 39) has a diameter "d" and radius "r". The upper blade 34 (or lower blade 38) has a diameter "D" and radius "R". The beneficial design of the upper hub 36 is defined to have a predefined relationship between the radius r of the upper hub 36 and the blade radius R. For example, the hub radius $r = x \cdot R$, where x can range from about 0.05 to 0.25. Using the relationship where hub radius $r = x \cdot R$, the hub radius r is a range of about 0.05R to 0.25R. Particularly, the hub radius r is 0.14R which provides beneficial results in reducing hub drag.

The beneficial design of the upper hub 36 is defined to have a predefined relationship between the hub thickness t and the hub diameter d. The hub thickness t is defined to be less than 35% of the hub diameter d without reaching 0%. The hub thickness t can range from about 10% to less than 35% of the hub diameter d. Particularly, the hub thickness t can be about 24.5% of the hub diameter d which provides beneficial results in reducing hub drag.

Although other techniques may have been attempted to solve the problem of drag, the new hub design according to one or more embodiments can be utilized on top of (i.e., in conjunction with) existing techniques, thereby reducing drag even more. Further, it should be appreciated that the new hub design is a passive design which can be simple to implement, according to one or more embodiments.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor assembly comprising:
a first rotor hub wherein the first rotor hub comprises a hub diameter and a hub thickness, the hub thickness being less than 35% of the hub diameter; and
a second rotor hub coupled to the first rotor hub via a shaft fairing, the first rotor hub having a flat first surface coupled to the shaft fairing and a curved second surface opposite the flat first surface.

2. The rotor assembly of claim 1, wherein the curved second surface and the flat first surface meet to form a rounded edge.

3. The rotor assembly of claim 1, wherein the curved second surface of the first rotor hub is smooth and continuous from a leading edge to a trailing edge, thereby maintaining air flow.

4. The rotor assembly of claim 1, wherein the second rotor hub comprises another flat first surface opposite a curved second surface.

5. The rotor assembly of claim 4, wherein the curved second surface of the second rotor hub is coupled to the shaft fairing.

6. The rotor assembly of claim 1, wherein the first rotor hub is structured to position a plurality of rotor blades.

7. The rotor assembly of claim 6, wherein the second rotor hub is structured to position another plurality of rotor blades.

8. The rotor assembly of claim 6, wherein the first rotor hub comprises a hub radius, the hub radius being about 0.05 to 0.25 times a value of a blade radius of one of the plurality of rotor blades.

9. The rotor assembly of claim 1, wherein the shaft fairing is structured to comprise a rotor shaft, the rotor shaft being operatively connected to at least one engine.

10. A rotary wing aircraft comprising:
at least one engine; and
a rotor assembly coupled to the at least one engine, the rotor assembly comprising:
a first rotor hub wherein the first rotor hub comprises a hub diameter and a hub thickness, the hub thickness being less than 35% of the hub diameter, and
a second rotor hub coupled to the first rotor hub via a shaft fairing, the first rotor hub having a flat first surface coupled to the shaft fairing and a curved second surface opposite the flat first surface.

11. The rotary wing aircraft of claim 10, wherein the curved second surface and the flat first surface meet to form a rounded edge.

12. The rotary wing aircraft of claim 10, wherein the second rotor hub comprises another flat first surface opposite a curved second surface.

13. The rotary wing aircraft of claim 12, wherein the curved second surface of the second rotor hub is coupled to the shaft fairing.

14. The rotary wing aircraft of claim 10, wherein the shaft fairing is structured to comprise a rotor shaft, the rotor shaft being operatively connected to the at least one engine.

15. The rotary wing aircraft of claim 10, wherein the curved second surface of the first rotor hub is smooth and continuous from a leading edge to a trailing edge, thereby maintaining air flow.

16. The rotary wing aircraft of claim 10, wherein the first rotor hub is structured to position a plurality of rotor blades.

17. The rotary wing aircraft of claim 16, wherein the second rotor hub is structured to position another plurality of rotor blades.

18. The rotary wing aircraft of claim 16, wherein the first rotor hub comprises a hub radius, the hub radius being about 0.05 to 0.25 times a value of a blade radius of one of the plurality of rotor blades.

* * * * *